Sept. 6, 1966 J. L. WATERS 3,271,602
CENTRIFUGAL SWITCHING MECHANISMS FOR DYNAMOELECTRIC MACHINES
Filed Sept. 5, 1963 2 Sheets-Sheet 1
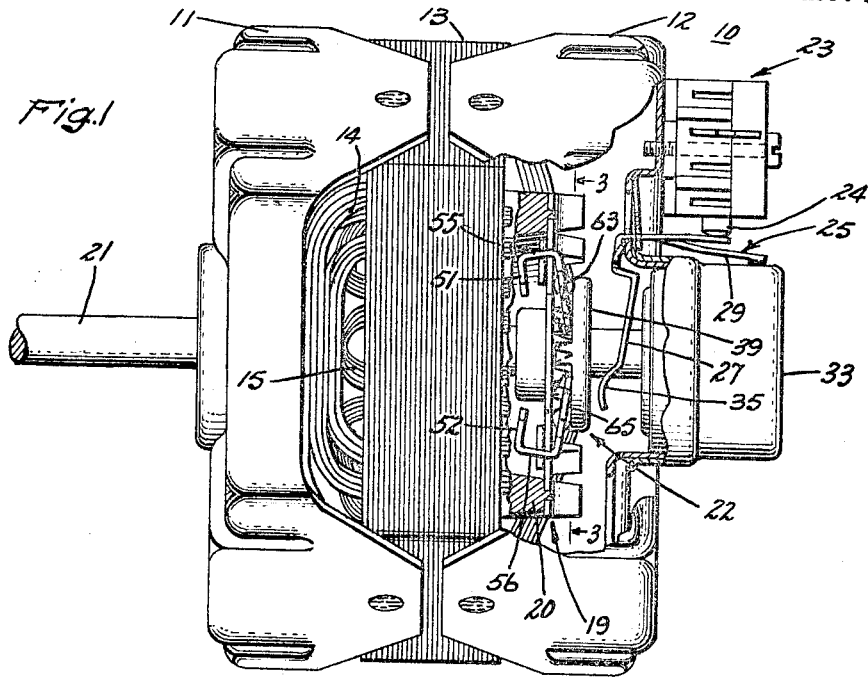
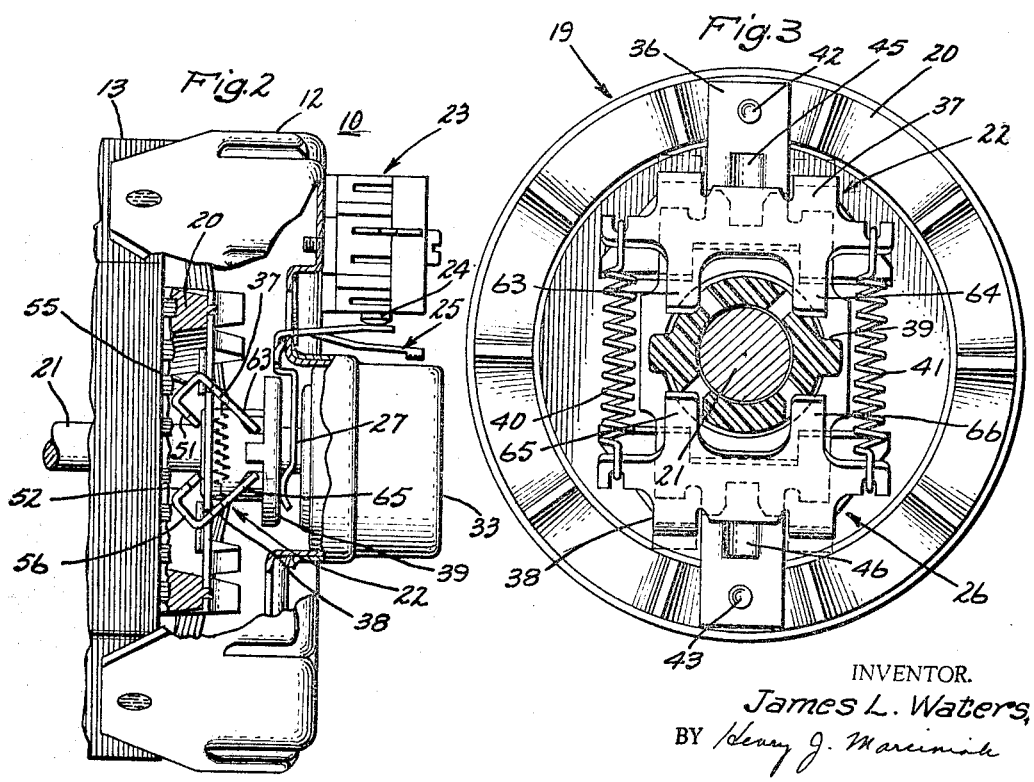
INVENTOR.
James L. Waters,
BY Henry J. Marciniak
Attorney.

Sept. 6, 1966  J. L. WATERS  3,271,602
CENTRIFUGAL SWITCHING MECHANISMS FOR DYNAMOELECTRIC MACHINES
Filed Sept. 5, 1963
2 Sheets-Sheet 2

INVENTOR.
James L. Waters,
BY Henry J. Marinich
Attorney.

United States Patent Office 3,271,602
Patented Sept. 6, 1966

3,271,602
CENTRIFUGAL SWITCHING MECHANISMS FOR DYNAMOELECTRIC MACHINES
James L. Waters, Malta, Ill., assignor to General Electric Company, a corporation of New York
Filed Sept. 5, 1963, Ser. No. 306,815
12 Claims. (Cl. 310—68)

The invention relates to centrifugal switching mechanisms and more particularly to centrifugal switching mechanisms for use in motors for controlling starting circuits in response to the speed of rotation of the motor.

In the operation of motors, such as single phase induction motors, a rotating magnetic field is provided by the use of a main and a starting winding. The two windings are usually physically displaced and are also electrically displaced. For example, by proper choice of the number of turns and resistance (size of the wire), the start winding is designed to provide a field that is out of phase with the main field, so that the resultant total field produces a starting torque. When the motor reaches a predetermined speed, the rotor will set up a pulsating field that lags the stator field and is capable of sustaining the rotation of the motor without the field of the start winding. Consequently, the starting circuit is generally disconnected by a centrifugal switching mechanism that is responsive to the predetermined speed of rotation.

In a commonly used arrangement the centrifugal switching mechanism is mounted on the shaft, and when the motor reaches the predetermined speed, a pair of centrifugal weights cause a movable collar to move in or out of engagement with a switch located within the motor frame. Such arrangements have not been entirely satisfactory because they add to the complexity of the overall assembly and increase the overall length of the frame member. Further, the control devices used in such conventional arrangements are not readily accessible for inspection or renewal if required.

Accordingly, a general object of this invention is to provide an improved centrifugal switching mechanism for dynamoelectric machines such as motors.

A more specific object of the present invention is to provide an improved centrifugal switching mechanism that can be readily assembled to the motor.

It is another object of the present invention to provide an improved centrifugal switching mechanism for a squirrel cage motor that efficiently utilizes the space between the rotor and the frame or end shield member.

A further object of the present invention is to provide an improved centrifugal switching mechanism having a switching or control device located where it is readily accessible for inspection and where it can be readily renewed.

In accordance with one form of my invention, I have provided an improved centrifugal switch mechanism for use in a motor having a rotor carried on a shaft of the rotatable assembly and a frame member rotatably supporting one end of the shaft in a bearing assembly. A circuit control device, such as a switch, is mounted externally on the frame member and has a movable control element for operating the control device. A switch actuator having a radial and an axial portion is provided for imparting a movement to the control element and is pivotally supported in an opening provided in the frame member of the motor. The radial portion of the actuator is disposed internally of the frame member, and the axial portion extends through the openings in the frame member for engagement with the movable element of the control device.

Preferably, as applied to a squirrel cage type of rotor, the centrifugal weight means for actuating the control device is carried on the end ring and includes a support plate which is fixedly attached to the end ring for rotation therewith. In a preferred exemplification of the invention, the centrifugal weight means includes a pair of centrifugal weight members formed with arms and supported for pivotal and radial movement on the support plate. A push member is carried by the arms of the centrifugal weight member, and a spring means connects the centrifugal weight members to hold the push member in a normally outward position when the rotor is at a standstill or rotates below a predetermined speed.

Further, in the exemplification of my invention, the radial portion of the switch actuator may be formed with a bifurcated section straddling the shaft and disposed so that when the push member is moved to the outward position, a pivotal movement of the switch actuator is effected, and the control device is actuated. When the rotor reaches a predetermined speed, the arms of the centrifugal weight members retract the push member to an inward position to permit the axial portion of the actuator to be moved with the movable element of the switching means in non-actuating relation therewith.

In a more specific aspect of the invention, I have provided a spring means between the end shield or frame member that normally biases the radial portion of the switch actuator to an inward position. Further, in the exemplification of the invention as applied to a motor with a bearing housing extending outwardly of the frame member, the axial portion of the actuator is preferably positioned between the movable element of the control device and the bearing housing so that the spring means biases the axial portion against the bearing housing when the radial portion of the actuator is disengaged from the push collar of the centrifugal weight means. The improved arrangement makes it possible to employ a centrifugal type of switching mechanism in a motor without significantly increasing the length of the motor frame.

The subject matter which I regard as my invention is set forth in the appended claims. The invention itself, however, together with further objects and advantages thereof may be better understood by referring to the following more detailed description taken in conjunction with the accompanying drawings in which:

FIGURE 1 is a side elevation of a motor incorporating a centrifugal switching mechanism of the invention with a portion of the frame member and rotor broken away and showing the position of the components of the centrifugal switching mechanism shown when the motor is in the operating condition;

FIGURE 2 is a partial side elevation corresponding to the view illustrated in FIGURE 1 in which the relative position of the components of the centrifugal switching mechanism are shown for the standstill condition of the motor;

FIGURE 3 is an enlarged end view of the centrifugal weight assembly attached to the end ring of the motor as seen along line 3—3 of FIGURE 1;

Figure 4:
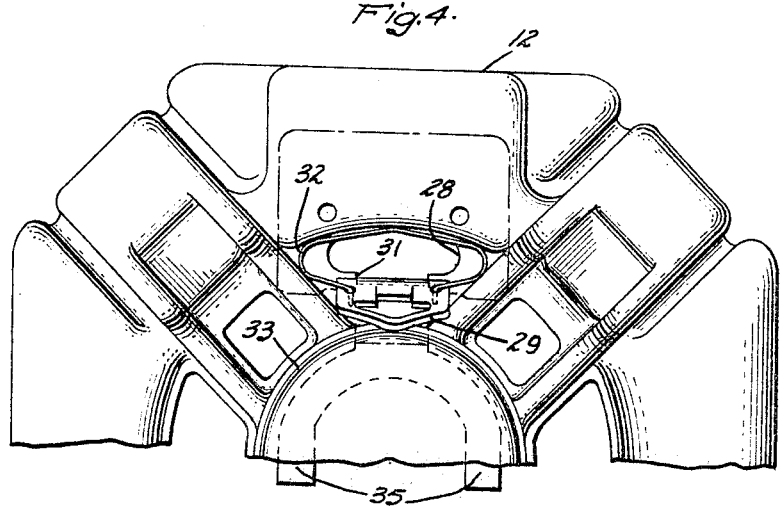
FIGURE 4 is an enlarged fragmentary end view of the switch end of the motor with the switch shown in dashed outline in order that the spring biasing arrangement for the actuator may be more clearly seen.

Referring now to the drawings in more detail and specifically to FIGURE 1, I have shown therein the centrifugal switch mechanism embodying the invention as applied to single phase induction motor 10. A pair of end shield or frame members 11, 12 are mounted on the stator 13 of the motor 10. The excitation for the motor 10 is provided by a single phase main field winding 14 and a starting winding 15 arranged in slots provided in the stator 13, and these windings 14, 15 cause currents to be induced in a squirrel cage winding arranged in slots of a rotor 19 and including an end ring 20. The rotor 19 is carried on a shaft 21 rotatably supported by the frame member 11, 12 in suitably lubricated bearings (not shown).

In the induction motor 10 used to illustrate specific application of the invention, it was required that the starting winding 15 be energized during the starting condition, or in other words, during the interval required to bring the motor up to a predetermined speed of rotation, at which speed the magnetic field set up by the rotor 19 is capable of sustaining the rotation of the motor 10. When the motor 10 reaches the predetermined speed, it is necessary to deenergize the starting winding. To accomplish this purpose, a circuit control device, such as the switch 23, is employed and is mounted externally on the frame or end shield member 12. The switch 23 includes a push type of movable element 24, which is biased downwardly as shown in FIGURE 1 and the switch 23 is normally in this position. To actuate the switch 23 the element or button 24 must be displaced by the application of a force sufficient to overcome the spring bias urging element 24 to the outward position.

Control of switch 23 is effected by a centrifugal switching mechanism 26 which will now be more fully described. As is best seen in the exploded view of FIGURE 5, the centrifugal switching mechanism 26 includes a switch actuator 25 and a speed responsive mechanism or centrifugal weight assembly 22. The switch actuator 25 is comprised of a radial portion 27 which extends through an opening 28 provided in the frame member 12 and an axial portion 29 which is disposed inwardly of the frame member 12 for engagement with the centrifugal switching mechanism 26. It will be seen that the actuator 25 is pivotally supported on a seat in the opening 28 provided in a wall of the frame member 12 and that the switch 23 is actuated by the pivotal movement of the actuator 25. As shown in FIGURE 1, the actuator 25 is shown at rest. In the position shown in FIGURE 2, the actuator 25 is held in a pivoted position, and the movable element 24 is displaced to actuate the switch 23.

Figure 5:
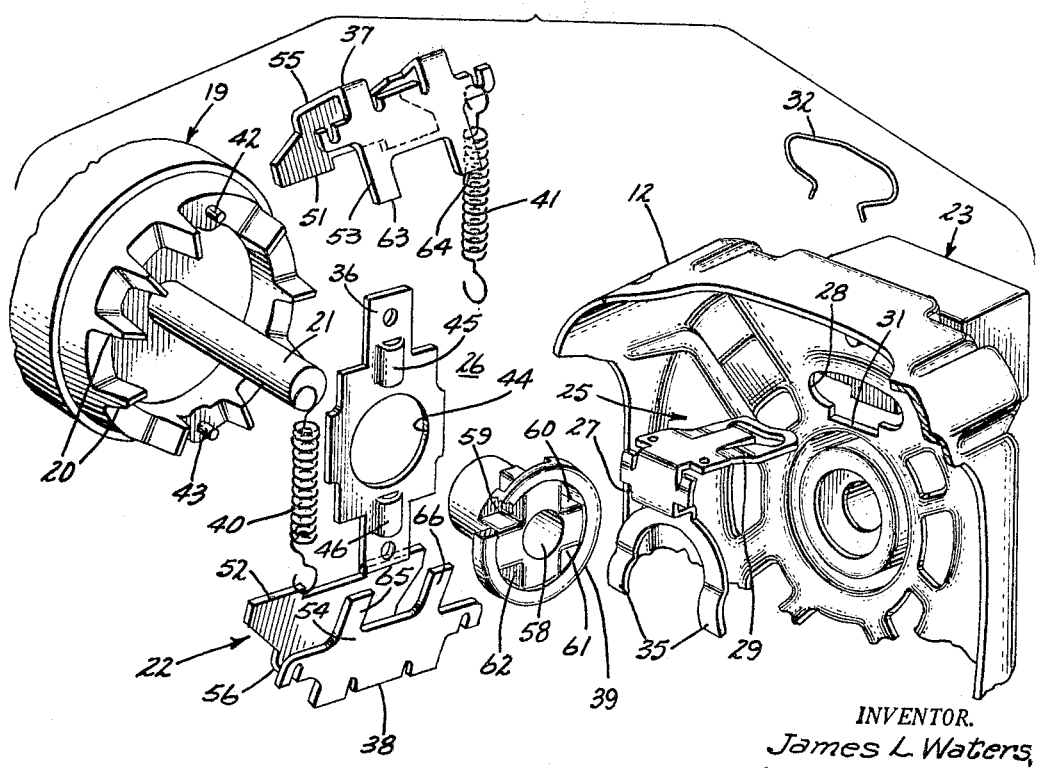
FIGURE 5 is an exploded perspective view of the centrifugal switching mechanism and the associated parts of the motor on which the parts of the centrifugal switching mechanism are assembled.

As shown in FIGURES 4 and 5, the opening 28 is formed with a recess 31 to furnish the seat which serves as the fulcrum for the actuator 25. An actuator spring 32 of generally U configuration urges the axial portion 29 against the bearing housing 33 and biases the axial portion 29 out of engagement with the movable element 24 during the operating condition.

As will be seen in the exploded view of FIGURE 5, the radial portion 27 of the actuator 25 is formed with a bifurcated section 35. When assembled on the motor 10, the bifurcated section 35 straddles the shaft 21 and is disposed for engagement with the centrifugal switching mechanism 26. During the running condition of the motor 10, as shown in FIGURE 1, the bifurcated section 35 is in an inward position, and the axial portion 29 is held in position against the bearing housing 33 by the spring 32 to prevent rattling of the actuator 25 during operation.

Continuing with the detailed description of the centrifugal switching mechanism, I will now more fully describe the components of the centrifugal switching mechanism 26. Referring more particularly to FIGURES 3 and 5, it will be seen that the centrifugal weight assembly 22 is attached to the end ring 20 for rotation with the rotor 19. The centrifugal weight assembly 22 is comprised of a pair of opposing weight members 37, 38 supported for pivotal and radial movement on the support plate 36 and an axial movable member or push collar 39 for engagement with the actuator 25. A pair of springs 40, 41 bias the opposing weight members 37, 38 to effect a displacement of the push member 39 to an outward position during the starting condition of the motor 10, as shown in FIGURE 2.

The centrifugal weight assembly 22 can be preassembled as a unit by placing the centrifugal weight members 37, 38 in position on the support plate 36 and in engagement with the push member 39. The springs 40, 41 when attached to the centrifugal weight members 37, 38 retain these parts in preassembled relation. The centrifugal weight assembly 22 is then attached to the end ring 20 by placing the support plate in assembled relation with the pins 42, 43 formed integrally on the ring 20 and by peening the ends of the pins 42, 43 to secure the support plate 36 to the end ring 20.

Having more specific reference now to the structural features of the several components of the centrifugal weight assembly 22 as shown in FIGURE 5, it will be seen that the support plate 36 is formed with a central shaft receiving aperture 44. A pair of dimples 45, 46 are provided and cooperate with openings formed in the weight members 37, 38 in order to prevent rattling of the weight members 37, 38 while the motor 10 is running.

The centrifugal weight members 37, 38 are essentially symmetrical parts and include a weight portion 51, 52 and an arm portion 53, 54 joined by a transverse member 55, 56, respectively. As will be seen in FIGURES 1 and 2, the weight portions 51, 52 and the transverse members 55, 56 are disposed at the inward side of the support plate 36. Thus, the space within the interior of the end ring 20 is effectively utilized. An important advantage in such an arrangement is that the length of the motor frame at the switch end does not have to be increased in order to provide space for the centrifugal weight assembly 22.

In the illustrative embodiment of the invention, as is best seen in FIGURE 5, the push member 39 was formed with a central opening 58 for receiving the shaft 21 and suitably dimensioned so as to allow for axial movement of the member 39 relative to the shaft 21. The push member 39 is also formed with four notches 59, 60, 61 and 62, in which arms 63, 64, 65 and 66 of the centrifugal weight members 37, 38 are engaged. Referring more specifically to FIGURE 2, arms 63, 64, 65 and 66 (only arms 63, 65 can be seen in FIGURES 1 and 2), urge the push member 39 to the outward position when the motor 10 is in the starting condition and hold the push member 39 in the inward position shown in FIGURE 2 during the operating condition.

Having more specific reference to the views shown in FIGURES 1 and 2, the operation of the improved centrifugal switch mechanism 26 will now be more fully described. Let us assume that the motor 10 is in a stalled condition. The force exerted by the springs 40, 41 is sufficient to hold the push member 39 in the outward position against the radial portion 27 as shown in FIGURE 2, and to maintain the push element 24 in an actuated position. As the motor 10 starts to rotate, the centrifugal weight members 37, 38 rotate with the rotor 19. When a predetermined speed of rotation is reached, the centrifugal force exerted by the weight members 37, 38 overcomes the opposing force of the springs 40, 41 and causes weight members 37, 38 to move radially outwardly on the support plate 36 with a pivotal movement. This pivotal movement results in an axial displacement of the push member 39 to the inward position as shown in FIGURE 1. During the operating condition, the push member 39 is retracted so that it does not engage the bifurcated section 35 of the actuator 25. As is best seen in FIGURE 4, spring 32 biases the axial portion 29 of the actuator 25 downwardly against the bearing housing 33. The actuator 25 is held in this position during operation to prevent rattling that would occur if the actuator 25 where not firmly held in position.

When the speed of rotation of the motor 10 decreases to the point where the centrifugal force exerted by the weight members 37, 38 is not sufficient to hold the weight members 37, 38 in a radially extended position, the push member 39 is axially displaced to the outward position. A pivotal movement of the actuator 25 results, and the centrifugal switching mechanism 26 returns to the starting condition shown in FIGURE 2.

From the foregoing description it will be apparent that the improved arrangement utilizes a minimum amount of axial space within the interior of a motor to achieve a centrifugal type of switch actuation. Accordingly, it is possible to design and construct motors with a frame having shorter axial dimensions as compared with motors employing conventional centrifugal switching mechanisms. Also, a relatively simple arrangement is provided that is readily adaptable to economical methods of assembly and manufacture.

Although I have shown and described a particular embodiment of my invention, it will be appreciated that many modifications will occur to those skilled in the art. It is, therefore, intended in the appended claims to cover all modifications that fall within the true spirit and scope of the invention.

What I claim as new and desire to secure by Letters Patent of the United States is:

1. A centrifugal switching mechanism for use in a motor having a rotatable assembly including a rotor carried on a shaft, an end shield member rotatably supporting one end of said shaft and a switching means mounted externally on the end shield member and including a movable switch element for actuating said switching means, said centrifugal switching mechanism comprising: a switch actuator pivotally supported on said end shield member and formed with a radial and an axial portion, said radial portion being disposed internally of the end shield member, said axial portion extending through an opening in the end shield member and being disposed in engaging relation to the movable switch element of the switching means, and said radial portion when urged in an axial direction causing a pivotal movement of said switch actuator and effecting a displacement of the switch element to actuate the switching means; and a centrifugal weight assembly mounted on the rotatable assembly for rotation therewith and including a pair of relatively movable centrifugal weight members, a push collar disposed concentrically about the shaft and axially movable with respect to the shaft, said push collar being carried by said centrifugal weight members, and a biasing means joined with said centrifugal weight members to urge said push collar against said radial portion of the switch actuator and hold the radial portion in an outward position during the starting condition, and said push collar being disengaged from said radial portion of the switch actuator by the retracting action of said centrifugal weight members when the motor reaches a predetermined speed thereby to permit said axial portion of the switch actuator to be moved with the push element of said switching means in non-actuating relation therewith.

2. A centrifugal switching mechanism for use in a motor having a rotor formed with end rings, a shaft rotatably supported in a frame member, a switching means mounted externally on the frame member and having a movable element for actuating said switching means, said centrifugal switching mechanism comprising: a support plate fixedly mounted on an end ring for rotation therewith, a pair of opposing centrifugal weight members mounted on said support plate for movement relative to said support plate, each of said weight members being formed with a centrifugal weight portion disposed between said support plate and said rotor and formed with an arm portion disposed at the outward side of said support plate, a push collar carried by said arm portions and disposed concentrically about the shaft, a spring biasing means connecting said centrifugal weight members and normally urging said arm portions to hold said push collar in an outward position when the rotor is at a standstill, a switch actuator having a radial portion extending axially outward through an opening in the frame member for engagement with the movable element of said switching means, said switch actuator being pivotally supported on said frame member, said push collar when biased to said outward position causing the axial portion of the switch actuator to engage the movable element and actuate the switch, and said centrifugal weight members causing the push collar to be displaced to an inward position when the rotor reaches a predetermined speed thereby to release the push collar from engagement with the radial portion of the switch actuator and permit the axial portion of the actuator to be moved with the movable element of the switch in non-actuating relation therewith.

3. A centrifugal switching mechanism for use in a motor having a rotor formed with end rings, a shaft rotatably supported in a frame member, a circuit control device mounted externally on said frame member and having a movable actuating element, said centrifugal switching mechanism comprising: a support plate attached to an end ring for rotation therewith, a pair of opposing centrifugal weight members supported on said support plate for movement relative to said plate, each of said centrifugal weight members being formed with a centrifugal weight portion disposed between said plate and said rotor and with an arm portion disposed outwardly of said plate, a push collar carried by said arm portions, a spring means connecting said pair of centrifugal weight members and urging said push collar in an outward position during the starting condition of the motor, said centrifugal weight members causing said push collar to be retracted to an inward position by effecting a pivotal movement of said arm portions when the motor reaches the operating condition, and an actuator having a radial portion formed with a bifurcated section straddling the shaft for engagement with the push collar, said actuator having a portion axially extending through the frame member and disposed for engagement with the movable element of the control device, said actuator being pivotally supported on the frame member, said push collar when moved to the outward position causing the axially extending portion of the actuator to engage the movable element and actuate the control device, and said push collar when moved to the inward position permitting the axially extending portion to be moved with the movable element of the control device.

4. In a motor having a rotor carried on a shaft, an end shield member rotatably supporting one end of said shaft, a switching means supported on said end shield member and actuable between an open and a closed position, said switching means including a push element for actuating said switching means to one of said positions, said end shield member including a wall being formed with an opening having seat means, the improvement comprising a switch actuator formed with a portion disposed internally of said end shield member and formed with a portion disposed for engagement with the push element of said switching means, said switch actuator being pivotally supported on the seat means in the opening to cause said push element to be displaced and thereby actuate said switching means when said internally disposed portion of the actuator is urged to a first position, means connected between said wall and said switch actuator for urging said switch actuator on said seat means, and a centrifugal weight assembly mounted on the end of the rotor and attached thereto, said centrifugal weight assembly including a pair of centrifugal weight members, and a spring means connecting said centrifugal weight members to cause said actuator to be held in said first position during the starting condition, and said centrifugal weight members causing said actuator to be disposed in a second position out of engagement with said centrifugal weight assembly during the operating condition of said motor.

5. In a motor including a frame member, a rotor having end rings and carried on a shaft rotatably supported by said frame member, a circuit control device mounted externally on said frame member and having a movable actuating element, the improvement comprising: a support plate attached to an end ring for rotation therewith, a pair of centrifugal weight members supported on said plate for movement relative thereto, each of said centrifugal weight members being formed with arms disposed at the outward side of said support plate and having a weight portion disposed inwardly thereof, a push member carried by said arms and disposed for axial movement relative to the shaft, spring means connecting said centrifugal weight members and urging said arms to hold said push member in a first position during the starting condition of the motor, said centrifugal weight members causing said push member to be moved to a first position in response to the speed of rotation of the rotor, and an actuator having a portion disposed internally of said frame member for engagement with said push member and having a portion disposed for engagement with the movable element of the control device, said push member when moved to the first position displacing said internally disposed portion of the actuator and causing said actuator to engage the movable element and actuate the control device, and said push member when moved to the second position causing said actuator to be released for movement in a direction away from the control device.

6. In a motor having a rotor carried on a shaft and an end shield member rotatably supporting one end of said shaft, a switching means mounted externally of said end shield member and having a push element for actuating said switching means, the improvement comprising: a switch actuator formed with a radial portion disposed internally of said end shield member and having a bifurcated section straddling the shaft, said switch actuator having an axial portion extending outwardly through the end shield member and disposed for engagement with the push element of said switching means, said switch actuator being pivotally supported on said end shield member to cause said push element to be displaced and actuate said switching means when the radial portion of the switch actuator is displaced to an outward position, a spring means interposed between said switch actuator and said end shield member to cause said radial portion to be normally biased to an upward position, a support plate attached to the rotor for rotation therewith, a pair of opposed centrifugal weight members mounted on said support plate, each of said centrifugal weight members being formed with a centrifugal weight portion and an arm portion, a push collar carried by said arm portions and being disposed coaxially about the shaft for axial movement relative to the shaft, spring means connecting said centrifugal weight members to normally cause said arm portions to urge said push collar against the radial portion of the actuator and hold the radial portion in the outward position when the rotation of the rotor is below a predetermined speed and to cause the push collar to be retracted inwardly when the rotor exceeds the predetermined speed thereby allowing the switch actuator to be moved with the push element of the switching means in non-actuating relation therewith.

7. In a motor having a rotor carried on a shaft, a frame member rotatably supporting one end of said shaft, a circuit control device mounted externally on the frame member and having a movable actuating element, an actuator supported for pivotal movement with respect to the frame member and having a radial portion and an axial portion, said radial portion being disposed internally of the frame member, said axial portion extending externally of the frame member for engagement with the movable element of the circuit control device, said radial portion of the actuator when moved to a first position effecting a pivotal movement thereof to cause the movable element of the control device to be displaced, a centrifugal weight means secured to rotate with said rotor, said centrifugal weight means causing said radial portion to be displaced to said first position to switch the circuit control device to one condition during the starting of the motor and causing the radial portion to be moved to a second position and switch the control device to another condition when the rotor reaches a predetermined speed.

8. In a motor, a frame member, a rotatable assembly including a rotor having a shaft rotatably supported by the frame member, and a circuit control device mounted externally on the frame member and having a movable actuating element, the frame member including a wall formed with an opening having seating means, the improvement comprising: an actuator pivotally supported on the seating means of the frame member and formed with a portion disposed internally of the frame member and a portion extending externally of the frame member for engagement with the movable element of the circuit control device, said internally disposed portion when displaced to a first position effecting a pivotal movement of the actuator to cause the control device to be switched to one condition, spring means biasing the actuator on the seating means in the opening; and a centrifugal weight means carried on the rotatable assembly for rotation therewith and engaging the actuator to effect a displacement of the internally disposed portion to the first position during starting of the motor, and to a second position when the rotor exceeds a predetermined speed.

9. In a motor including a frame member, a rotor having end rings and carried on a shaft rotatably supported by the frame member, a circuit control device mounted externally on said frame member and having a movable element for actuating the control device, said movable element being normally biased to one position and displaced to actuate the control device, the improvement comprising: a support plate attached to an end ring of the rotor for rotation therewith and extending radially across said end ring, said support plate having an opening for receiving the shaft, a pair of opposed centrifugal weight members supported on said plate for pivotal and radial movement, each of said centrifugal weight members being formed with an arm portion having a pair of arms and a weight portion, said weight portion and said arm portion being joined by a transverse member, a push member disposed for movement with respect to the shaft and formed with notches, a spring means biasing said arms into engagement with the slots formed in said push member and effecting a displacement of said push member to an outward position during the starting condition, said centrifugal weight members retracting said push member to an inward position when the rotor reaches a predetermined speed, and an actuator pivotally supported on said frame member and having a radial portion and an axial portion, said radial portion of said actuator being disposed internally of said frame member for engagement with said push member, said axial portion extending through an opening in the frame member for engagement with the movable element of the control device, said push member when moved to the outward position causing the axial portion of the actuator to engage the movable element and actuate the control device, and said push member when moved to the inward position causing the axial portion of the actuator to be released for movement in a direction away from the control device.

10. In a motor including a frame member, a rotor having end rings and carried on a shaft rotatably supported by the frame member, said frame member having a bearing housing means extending radially outward of said frame member, and a circuit control device mounted on said frame member and including a movable element for actuating the control device, said moveable element being spaced from the bearing housing means, the improvement comprising: a switch actuator pivotally supported on said frame member and formed with a radial and an axial portion, said radial portion being disposed internally of said frame member and having a bifurcated section straddling the shaft, said axial portion extending outwardly through the frame member and between said movable element and said bearing housing means, a spring means disposed between said axial portion and frame member to normally bias said axial portion toward said bearing housing means and out of engagement with the movable element of the control device, a support plate attached to an end ring of the motor for rotation therewith, a pair of opposing centrifugal weight members supported on said plate for pivotal and radial movement, each of said centrifugal weight members having an arm portion disposed at the outward side of the support plate and having a weight portion disposed at the inward side thereof, a push member carried by the arm portions of said centrifugal weight members, spring means connecting said centrifugal weight members and biasing said arm portions to hold said push member in an outward position during the starting condition of the motor, and said centrifugal weight members retracting said push member to an inward position out of engagement with the axial portion of the actuator when the rotor exceeds a predetermined speed, said push member when moved to the outward position effecting a pivotal movement of the actuator to actuate the control device, and said push member when moved to the inward position causing the actuator to be moved with the movable element of the control device.

11. In a motor, frame means; a rotatable assembly including a rotor and a shaft rotatably supported by the frame means; said frame means having a wall including an opening therein; a speed responsive mechanism carried by the rotatable assembly including an axially movable member; a circuit control device mounted by said frame means and having a movable actuating element positioned externally of said wall; a switch actuator having first and second portions operatively connecting said axially movable member and movable actuating element of the circuit control device together; said actuator being pivotally supported in the opening of said wall intermediate said first and second portions, with said first portion extending toward said axially movable member and being engageable therewith internally of the motor, and with said second portion projecting toward said movable actuating element of the circuit control device and being engageable therewith externally of the motor; and spring means mounted under compression between said switch actuator and said wall of the frame means in the vicinity of the opening for biasing said second portion in a direction away from said movable actuating element of said circuit control device during operating conditions of the motor.

12. In a motor, frame means; a rotatable assembly including a rotor and a shaft rotatably supported by the frame means; said frame means having a wall including an opening in the wall outwardly of said shaft; a speed responsive mechanism carried by the rotatable assembly including an axially movable member; spring means normally urge said axially movable member away from said rotor into a first position; a circuit control device mounted by said frame means and having a movable actuating element positioned externally of said wall; a switch actuator having first and second portions operatively connecting said axially movable member and movable actuating element of the circuit control device together; said actuator being pivotally supported in the opening of said wall intermediate said first and second portions, with said first portion extending toward said axially movable member and being engageable therewith internally of the frame means, and with said second portion projecting toward said movable actuating element of the circuit control device and being engageable therewith externally of the frame means; and a generally U-shaped compression spring maintaining said switch actuator in said opening for pivotal movement and biasing said second portion of the switch actuator in a direction away from said movable actuating element of said circuit control device during operating conditions of the motor; said generally U-shaped spring being held under compression by said wall of said frame means and said switch actuator at a location between the recess and said movable actuating element of said circuit control device; the bias of said spring means being of greater magnitude than the bias of the U-shaped spring when said axially movable member is in the first position whereby the second portion of said switch actuator is pivotally held against said switch actuating element.

References Cited by the Examiner
UNITED STATES PATENTS 2,452,807   11/1948   Thompson _____ 310—68.5

MILTON O. HIRSHFIELD, *Primary Examiner.*

A. J. ROSSI, *Assistant Examiner.*